United States Patent [19]

Matsuda

[11] Patent Number: 4,862,364

[45] Date of Patent: Aug. 29, 1989

[54] SELF-MONITOR SYSTEM FOR AUTOMOTIVE DIGITAL CONTROL SYSTEM INSENSITIVE TO BATTERY VOLTAGE FLUCTUATIONS

[75] Inventor: Toshiro Matsuda, Sagamihara, Japan

[73] Assignee: Nissan Motor Co., Ltd., Yokohama, Japan

[21] Appl. No.: 126,513

[22] Filed: Nov. 30, 1987

Related U.S. Application Data

[63] Continuation of Ser. No. 619,305, Jun. 11, 1984, abandoned.

[30] Foreign Application Priority Data

Jul. 8, 1983 [JP] Japan ................................ 58-123299

[51] Int. Cl.$^4$ ............................................. G06F 11/22
[52] U.S. Cl. ............................... 364/424.01; 123/491;
73/116; 364/431.1; 364/550
[58] Field of Search .................... 364/431.1, 569, 550,
364/424, 486, 424.01, 424.05; 73/116; 123/491,
179 A, 199 B, 179 R; 340/52 F

[56] References Cited

U.S. PATENT DOCUMENTS 4,282,574  8/1981  Yoshida et al. ................. 364/431.10
4,310,888  1/1982  Furuhashi et al. ............... 364/431.10
4,397,281  8/1983  Nakano et al. ...................... 123/486
4,401,949  8/1983  Gold ..................................... 324/402
4,517,952  5/1985  Hosoya ........................... 123/480 X
4,709,341 11/1987  Matsuda ............................. 364/550

Primary Examiner—Parshotam S. Lall
Assistant Examiner—Thomas G. Black
Attorney, Agent, or Firm—Foley & Lardner, Schwartz, Jeffery, Schwaab, Mack, Blumenthal & Evans

[57] ABSTRACT

A self-monitor system has a delay circuit active in response to the end of engine cranking to enforce a predetermined time delay which is long enough for battery voltage to recover to normal levels. The delay circuit outputs a command for execution of self-monitoring operations by the digital control system after the predetermined time delay. The self-monitor system in the digital control system is responsive to the command from the delay circuit to check the battery voltage and to apply dummy loads to system elements at levels sufficient to simulate actuation of the elements to be checked, such as sensors, actuators and/or indicators. By enforcing the time delay time, the influence of temporary drops in battery voltage due to overloading during engine cranking can be fully avoided.

8 Claims, 2 Drawing Sheets

SELF-MONITOR SYSTEM FOR AUTOMOTIVE DIGITAL CONTROL SYSTEM INSENSITIVE TO BATTERY VOLTAGE FLUCTUATIONS

This application is a continuation of application Ser. No. 619,305, filed June 11, 1984 now abandoned.

BACKGROUND OF THE INVENTION

The present invention relates generally to a self-monitor system for checking components and/or elements of a digital control system for an automotive vehicle. More particularly, the invention relates to a self-monitor system performing a checking operation for the digital control system in a cold start, which is insensitive to temporary drops in battery voltage during engine cranking.

Recently, various digital control systems have been used in automotive vehicles for controlling various vehicle components, such as engines, automatic power transmissions, brake systems and air conditioners. Usually, such digital control systems include a self-monitor which detects and announces errors in control operation due to failure of one or more components and/or elements, such as sensors, actuators and/or indicators. Some of the self-monitor systems operate in response to an initial reset or initialization of the digital control system to perform checking or testing operations upon initialization in response to starting of the power supply, i.e., during a so-called "cold start".

As is well known, it takes a great deal of power to drive a starter motor of an internal combustion engine to start the engine. This engine start-up operation is always a heavy load on the vehicle battery and brings about a battery voltage drop. Therefore, it is possible that battery voltage will temporarily drop below an allowable range. Battery voltage can be returned to normal level by recharging it with electric power from a generator associated with the engine. A short period of time is required for the battery voltage to recover to its normal level. If the self-monitor system is active during this period of battery voltage recovery, the battery may be judged to be no good. In addition, when the sensors, actuators and indicators are checked by applying dummy loads thereto, insufficient dummy loads may be applied to the sensor, actuators and indicators. Some of the elements to be checked may not fully respond to the dummy loads and so be judged to be no good. As a result, despite normal operation of the battery and/or elements, malfunction may be indicated.

If self-monitor operations can be performed after the period necessary for recovery of the battery voltage expires, the possibility of erroneous judgement will be minimized or avoided.

SUMMARY OF THE INVENTION

Therefore, it is an object of the present invention to provide a self-monitor system for an automotive digital control system, which can avoid the influence of temporary drops in battery voltage during engine cranking.

Another and more specific object of the invention is to provide a self-monitor system in an automotive digital control system in which self-monitoring operations are performed after expiration of a predetermined period long enough for recovery of the battery voltage.

In order to accomplish the above-mentioned and other objects, a self-monitor system, according to the present invention, has a delay circuit active in response to the end of engine cranking to provide a predetermined time delay which is long enough for the battery voltage to return to normal levels. The delay circuit outputs a command for performing self-monitoring operations in the digital control system after the predetermined time delay. The self-monitor system in the digital control system is responsive to the command from the delay circuit to check the battery voltage and apply dummy loads at sufficient levels to simulate actuation of the elements to be checked, such as sensors, actuators and/or indicators.

By providing the delay time, the influence of temporary drops in battery voltage during engine cranking due to overloading can be successfully avoided.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
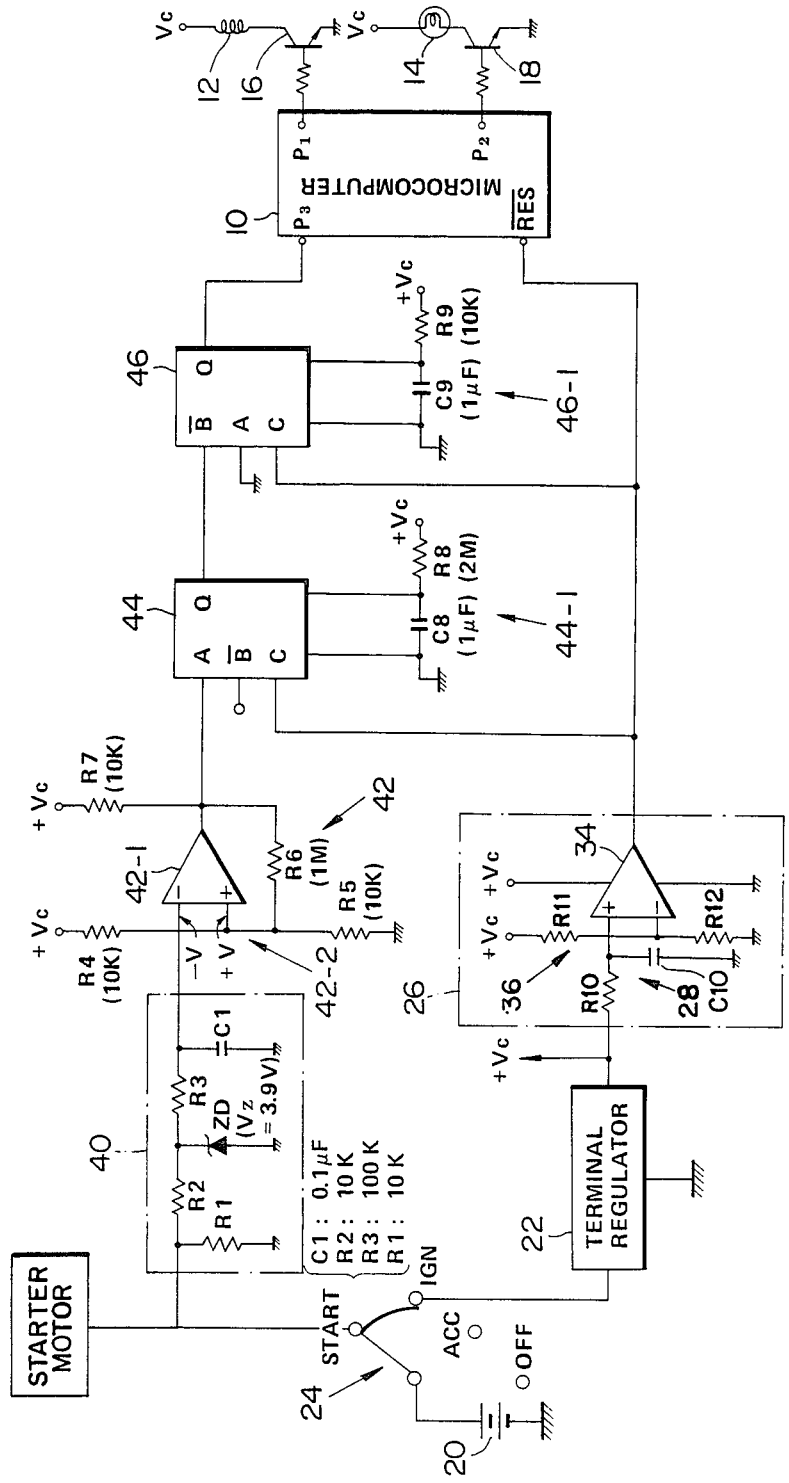
FIG. 1 is a schematic block diagram of the preferred embodiment of a self-monitor system of a digital control system in accordance with the present invention.

Referring now to the drawings, FIG. 1 shows a block diagram of the preferred embodiment of a self-monitor system for a digital control system including a microprocessor 10, according to the present invention. The microprocessor contains a self-monitor program which checks the operation of actuators 12 and monitor or indicator lamps 14 by applying dummy loads thereto. The microprocessor 10 is connected to the actuators 12 via an output terminal $P_1$ and a witching transistor 16. The microprocessor 10 is further connected to the monitor lamp 14 via an output terminal $P_2$ and a switching transistor 18.

On the other hand, the microprocessor 10 is connected to a vehicle battery 20 via a power regulator 22. An ignition switch assembly 24 is interposed between the battery 20 and the power regulator 22 and serves as the system main switch. Though the embodiment shown has been directed to a digital control system which is operative in response to actuation of the ignition switch assembly and continues operating throughout the engine driving state, it may be possible to provide a system main switch which actuates the control system independently of engine operation.

The self-monitor program to be executed by the microprocessor 10 is designed to perform initial checking of the control system and thus to be executed during "cold start" of the microprocessor.

Such self-monitor system has been also disclosed in my related co-pending patent applications identified herebelow:

| Basic Japanese Application (Attorney's docket number) | Title of the Invention |
|---|---|
| Pat. Appln. 58-84903 | FAILURE-MONITOR SYSTEM |

-continued

| Basic Japanese Application (Attorney's docket number) | Title of the Invention |
|---|---|
| now U.S. Pat. No. 4,667,176 | FOR AN AUTOMOTIVE DIGITAL CONTROL SYSTEM |
| Pat. Appln. 58-84904 | ANTI-SKID BRAKE CONTROL SYSTEM WITH FAIL-SAFE SYSTEM RESPONSIVE TO ABNORMAL STATE OF POWER SUPPLY |
| Pat. Appln. 58-84905 now U.S. Pat. No. 4,597,052 | DIGITAL CONTROL SYSTEM WITH ERROR MONITOR OPERATIVE UPON STARTING SYSTEM OPERATION |

The disclosure of the above-identified co-pending applications are hereby copied and incorporated by reference.

During cold start of the control system, the system is initialized in response to the onset or power-up of the power supply. In order to perform initial reset of the control system, a reset signal 26 is connected to the $\overline{\text{RES}}$ terminal of the microprocessor 10. The reset signal generator 26 includes a delay circuit 28 for performing a predetermined time delay before outputting a reset signal to activate the microprocessor to perform initial resetting or initialization. The power regulator 22 is connected to the vehicle battery 20 through an IGN terminal of the ignition switch assembly 24.

As is well known, the ignition switch assembly 24 includes the IGN terminal which supplies electrical power to the ignition system for the engine, an ACC terminal supplying power to electrical accessories of the vehicle, and a START terminal connecting a starter motor to the battery in order to start the engine.

The delay circuit 28 of the reset signal generator includes a resistor R10 and a capacitor C10 constituting an integrator circuit and a differential amplifier 34 receiving the regulated voltage Vc at its negative input terminal (−) via voltage divider 36 including divider resistors R11 and R12. The positive input terminal (+) of the differential amplifier 34 is connected to the integrator circuit to receive an input increasing at a rate determined by the time constant of the integrator circuit. The differential amplifier 34 sends the reset signal to the reset terminal $\overline{\text{RES}}$ of the microprocessor 10 after the predetermined time delay determined by selection of the resistance of the resistors R11 and R12 in relation to the input from the integrator circuit.

The microprocessor 10 also has an input terminal P3 which receives a check-start command from a timing circuit and which can be accessed by a self-monitor section of the microcomputer to activate same. The timing circuit is in turn connected to the battery 20 via the START terminal of the ignition switch assembly 24. The timing circuit includes a CR-filter 40, a Schmitt trigger circuit 42, monostable multivibrators 44 and 46.

The CR-filter 40 includes input resistors R1 and R2, a Zenor diode ZD for regulating fluctuations of supply voltage and absorbing voltage fluctuation due to chattering at the START terminal, and an integrator including a resistor R3 and a capacitor C1. The integrator circuit serves to smooth the supply power for the starter motor which might otherwise fluctuate. The output of the CR-filter 40 is sent to the negative input terminal of a differential amplifier 42-1 of the Schmitt trigger circuit 42. The positive input terminal of the differential amplifier 42-1 is connected to the regulated power source via a voltage divider 42-2 including divider resistors R4 and R5 to receive a reference voltage determined by the resistance values of the resistors R4 and R5. Therefore, the differential amplifier output goes high when the regulated voltage Vc is first produced after the IGN terminal is closed and then goes low after the output of the CR-filter 40 becomes greater than the reference voltage. The output of the differential amplifier 42-1 is fed back to the positive input terminal to lower the reference voltage and to provide hysteresis.

The output of the Schmitt trigger circuit 42 is sent to an input terminal A of the monostable multivibrator 44. The monostable multivibrator 44 is associated with a time constant circuit 44-1 including a capacitor C8 and a resistor R8, the values of which define a time constant T1. The monostable multivibrator 44 is responsive to change of the differential amplifier output from LOW level to HIGH level to output a HIGH level signal for a period of time corresponding to the time constant T1 determined by the time constant circuit 44-1, through the output terminal Q. The monostable multivibrator 44 sends a HIGH-level output for the period T1 to input terminal B of the monostable multivibrator 6. The monostable multivibrator 46 is associated with a time constant circuit 46-1 which defines time constant T2 of the monostable multivibrator 46. The monostable multivibrator 46 is responsive to the trailing edge of HIGH-level output of the monostable multivibrator 44 to output LOW-level signal for a period of time determined by the time constant circuit 46-1.

The microprocessor receives the output of the monostable multivibrator 46 as a trigger signal and performs self-monitoring or checking operation when the input level changes from LOW to HIGH. In the self-monitoring operation the microprocessor 10 applies dummy loads to the actuators 12 and the monitor lamps 14 in order ensure proper operation thereof.

Figure 2:
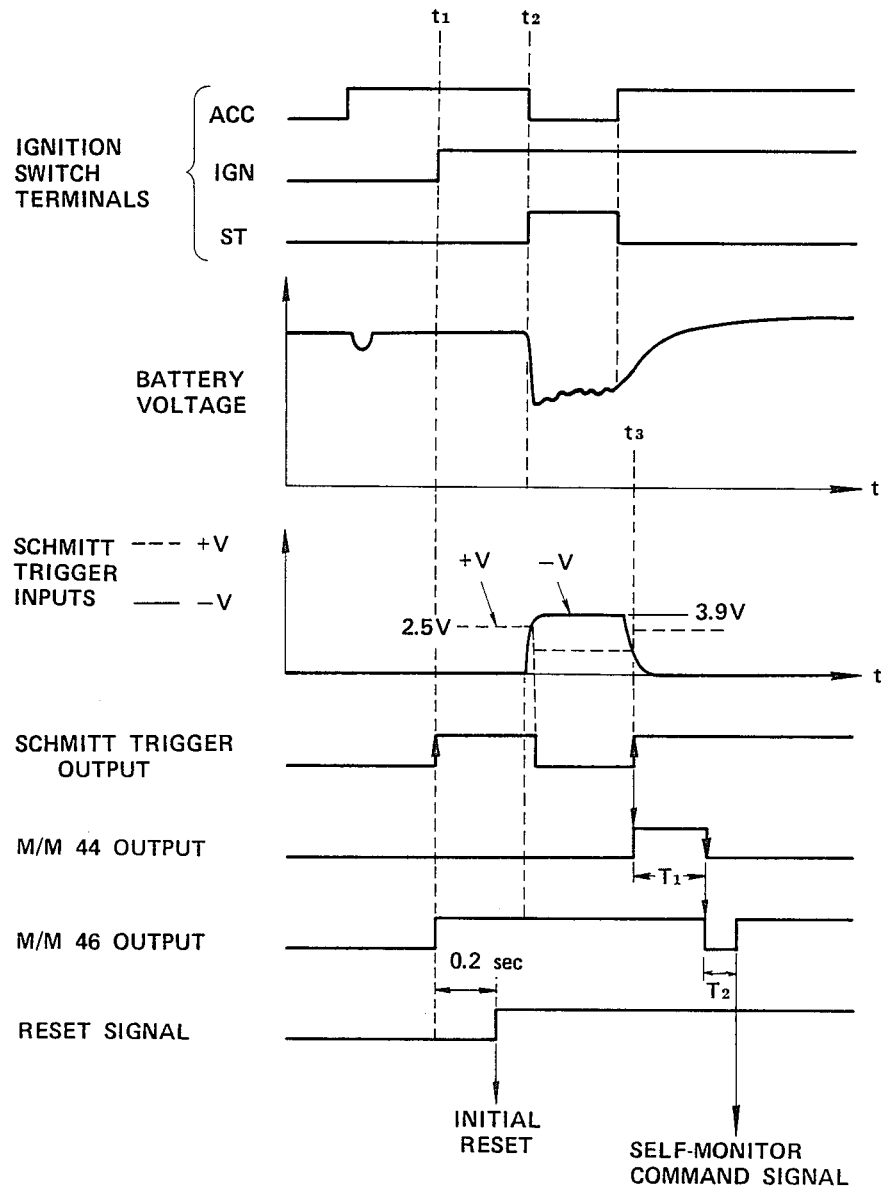
FIG. 2 is a timing chart showing operation of the elements of the self-monitor system of the preferred embodiment of FIG. 1.

FIG. 2 is a timing chart of operation of the preferred embodiment of self-monitor system.

At a time $t_1$, the ignition switch assembly 24 is operated to close the IGN terminal. Since the power regulator 22 is connected to the battery 20 via the IGN terminal, the power regulator 22 then starts to supply regulated power to the digital control system.

After the delay time provided by the reset signal generator 26, e.g. 0.2 sec., the reset signal generator sends a HIGH-level reset signal to the reset terminal $\overline{\text{RES}}$ of the microprocessor 10 to trigger initialization. At the same time, the Schmitt trigger circuit 42 receives the regulated voltage Vc and so sends a HIGH-level output to the input terminal A of the monostable multivibrator 44.

At time $t_2$, the START terminal is closed to actuate the starter motor. As the negative input terminal of the differential amplifier 42-1 of the Schmitt trigger circuit 42 is connected to the battery 20 through the START terminal 33 and the CR-filter 40, the input level thereof increases to a level exceeding the reference voltage applied to the positive input terminal of the differential amplifier 42-1. As a result, shortly after time $t_2$, the output level of the Schmitt trigger circuit 42 goes LOW. After engine cranking is completed and the START terminal is again open, the input level at the negative input terminal of the differential amplifier 42-1 drops below the reference voltage, at a time $t_3$. Thus, the output level of the Schmitt trigger circuit 42 goes from LOW to HIGH.

The monostable multivibrator 44 is responsive to the change from LOW-level to HIGH-level input to output a HIGH-level signal for the period $T_1$. After expiration of the period $T_1$, the output of the monostable multivibrator 44 goes from HIGH-level to LOW-level. The monostable multivibrator 46 is responsive to the trailing edge of the HIGH level output of the monostable multivibrator 44 to change from HIGH to LOW. The output of the monostable multivibrator 46 remains LOW level for the period $T_2$.

Since the microprocessor is responsive to the change of the input level from LOW to HIGH to permit execution of the self-monitoring operations, the self-monitoring operation will take place after expiration of the period $T_2$, i.e., at time $t_3 + T_1 + T_2$.

As will be appreciated from FIG. 2, since relatively high power is required to drive the starter motor, the battery voltage drops by a significant amount during engine cranking. After termination of engine cranking, battery voltage may recover gradually. In accordance with the present invention, since self-monitoring operations such as applying dummy loads to actuators and indicator lamps, will be performed after a given time delay, and battery voltage will have returned to normal levels to ensure sufficiently high dummy loads on the actuators and indicator lamps. As a result, erroneous judgment due to lack of power applied to the actuators and indicator lamps during monitoring operations can be satisfactorily prevented.

Therefore, the present invention fulfills all of the objects and advantages sought therefor.

What is claimed is:

1. A self-monitoring system for an automotive digital control system which checks elements to be controlled by the system comprising:

an ignition switch assembly interposed between said control system and said vehicle battery and supplying battery power to said control system in a first switch position thereof;

first means for applying a testing voltage having a signal level operating said element to a predetermined condition, for testing operation of said elements; and second means for activating said first means with a given delay period after said ignition switch assembly is actuated from a predetermined second switch position to said first switch position.

2. The self-monitor system as set forth in claim 1, wherein in said first switch position, said battery supplies power to an ignition system of an automotive engine.

3. The self-monitor system as set forth in claim 2, wherein in said second switch position, said battery supplies power to a starter motor in order to start the engine.

4. The self-monitor system as set forth in claim 3, wherein said given delay period is long enough for the battery voltage to return to its normal unloaded level after starter motor operation.

5. The self-monitor system as set forth in claim 4, which further comprises a delay timer responsive to termination of starter motor operation to measure said given delay time.

6. A self-monitoring system for an automotive digital control system associated with a vehicle battery for receiving power from the latter, the vehicle battery also supplying power to an ignition system and a starter motor for an automotive engine, said self-monitor system checking subsidiary elements to be controlled by the control system, the self-monitor system comprising:

an ignition switch assembly connected to said battery and operable to any of a plurality of switch positions including a first position in which battery power is supplied to said ignition system and a second position in which battery power is supplied to said starter motor, said ignition switch assembly being associated with said control system for supplying battery power to the latter when it is placed in a preselected switch position thereof;

first means for applying testing signals having values operating said elements to predetermined positions, and second means for activating said first means with a predetermined period of time delay after the end of starter motor operation.

7. The self-monitor system as set forth in claim 6, wherein said predetermined period of time is longer than the period of time required for the battery voltage to return to its normal, unloaded level after operation of said starter motor.

8. The self-monitor system as set forth in claim 7, further comprising means, interposed between said ignition switch assembly and said activating means, for applying regulated battery voltage to said activating means.

* * * * *